United States Patent
Mansuino et al.

(10) Patent No.: US 11,457,648 B2
(45) Date of Patent: Oct. 4, 2022

(54) PROCESS FOR DISPENSING FLUID FOODSTUFF MATERIAL INTO A SHAPING CAVITY OF A MOULD

(71) Applicant: SOREMARTEC S.A., Findel (LU)

(72) Inventors: Sergio Mansuino, Castiglione Falletto (IT); Gabriele Ratto, Alba (IT)

(73) Assignee: SOREMARTEC S.A., Findel (LU)

( * ) Notice: Subject to any disclaimer, the term of this patent is extended or adjusted under 35 U.S.C. 154(b) by 378 days.

(21) Appl. No.: 16/690,531

(22) Filed: Nov. 21, 2019

(65) Prior Publication Data

US 2020/0163357 A1 May 28, 2020

(30) Foreign Application Priority Data

Nov. 23, 2018 (IT) .................. 102018000010552

(51) Int. Cl.
| | |
|---|---|
| A23G 1/00 | (2006.01) |
| A23G 1/20 | (2006.01) |
| A23G 1/22 | (2006.01) |
| A23G 1/26 | (2006.01) |

(52) U.S. Cl.
CPC ......... *A23G 1/0066* (2013.01); *A23G 1/0093* (2013.01); *A23G 1/206* (2013.01); *A23G 1/22* (2013.01); *A23G 1/26* (2013.01)

(58) Field of Classification Search
CPC .... A23G 1/0066; A23G 1/0093; A23G 1/206; A23G 1/22; A23G 1/26
USPC ....................................... 426/515
See application file for complete search history.

(56) References Cited

U.S. PATENT DOCUMENTS

| | | | | |
|---|---|---|---|---|
| 2007/0172565 | A1* | 7/2007 | Kaiser | A23G 3/007 426/512 |
| 2011/0121016 | A1 | 5/2011 | De Grood et al. | |

FOREIGN PATENT DOCUMENTS

| | | |
|---|---|---|
| CA | 2686009 A1 | 5/2011 |
| NL | 1005306 C1 | 8/1998 |
| NL | 2000466 C2 | 8/2008 |
| WO | 2016010435 A1 | 1/2016 |
| WO | 2017014629 A1 | 1/2017 |

\* cited by examiner

*Primary Examiner* — Brent T O'Hern
(74) *Attorney, Agent, or Firm* — Rothwell, Figg, Ernst & Manbeck, P.C.

(57) ABSTRACT

A process for dispensing fluid foodstuff material into a shaping cavity of a mould is provided. The process includes advancing a plurality of moulds on a conveying line, along an advancement direction, each comprising at least one shaping cavity. The process includes dispensing a given quantity of the material through one or more of the nozzles, into the at least one shaping cavity of a mould. The dispensing step is executed while the mould continues to advance below the nozzle formation, along the advancement direction. The at least one shaping cavity of the mould has a depth that varies along the advancement direction. The dispensing step comprises varying the quantity of material dispensed into the shaping cavity as a function of the position of the mould along the advancement direction in such a way that the dispensed quantity is a function of the depth variation within the shaping cavity.

12 Claims, 3 Drawing Sheets

PROCESS FOR DISPENSING FLUID FOODSTUFF MATERIAL INTO A SHAPING CAVITY OF A MOULD

CROSS REFERENCE TO RELATED APPLICATION(S)

This application claims priority to Italian Application No. 102018000010552, filed Nov. 23, 2018. The entirety of the disclosure of the above-referenced application is incorporated herein by reference.

TEXT OF THE DESCRIPTION

The present invention relates to moulding in the industrial field of food products of fluid foodstuff material. In particular, the present invention focuses on the step of depositing and dispensing the foodstuff material into the shaping cavity of the mould.

With particular reference to the moulding of chocolate products, the known industrial processes comprise a dispensing station in which the moulds are made to stand, in succession, for the dispensing of a predetermined volume of chocolate in their respective shaping cavities.

Usually, this dispensing station is designed for a specific application and is therefore arranged to operate optimally for this.

For example, this station may comprise a number of nozzles for dispensing the chocolate equal to the number of shaping cavities of the individual moulds, and/or will have a rigid setting of the various operating parameters, which will be optimized for the dispensing of the specific volume of chocolate required for the application.

Moreover, in these known processes, since the dispensing of the chocolate takes place in a precise position of the cavity of the mould, the fluidity of the chocolate is exploited to fill the entire cavity, usually with the aid of vibrations to which the mould is subjected to expand the chocolate over the entire area of the shaping cavity.

However, in moulding processes of products characterized by complex shapes, obtaining the required distribution of chocolate in the individual mould cavity can, however, be difficult and it may be necessary to adopt particular devices, for example, to increase the excess quantity of chocolate dispensed into the mould, which greatly complicate the implementation and control of the process.

The documents WO201714629, WO201610435 A1, US20110121016 A1, CA2686009 A1, NL2000466 C2, and NL1005306 C1, relate to known systems for dispensing liquids for decorating food products.

In this context, the present invention proposes a new process and a new system for depositing foodstuff material in general, in the fluid state, into a shaping cavity of a mould.

The new process and system described herein are described by the claims.

BRIEF DESCRIPTION OF DRAWINGS

Further characteristics and advantages of the invention will become apparent from the description that follows with reference to the attached drawings, provided purely by way of non-limiting example, wherein.

DETAILED DESCRIPTION OF INVENTION

Figure 1:
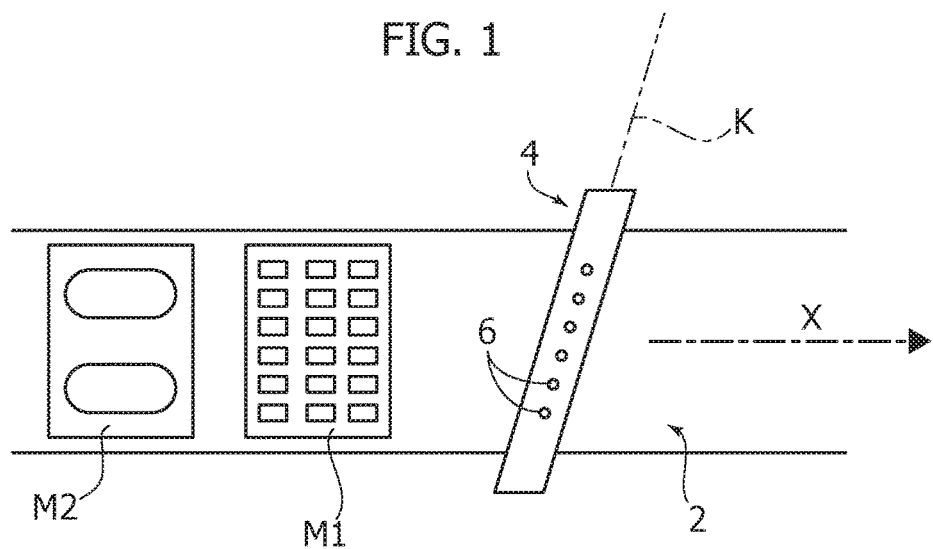
FIG. 1 schematically represents an embodiment of the system described herein.

In the following description, various specific details are illustrated aimed at a thorough understanding of the embodiments. The embodiments may be implemented without one or more of the specific details, or with other methods, components, materials, etc. In other cases, known structures, materials or operations are not shown or described in detail to avoid obscuring various aspects of the embodiments.

The references used here are only for convenience and do not therefore define the field of protection or the scope of the embodiments.

As anticipated above, the solution described herein relates to a new process and a new system for depositing fluid foodstuff material into a shaping cavity of a mould.

In general, the process described herein comprises the steps of:

advancing a plurality of moulds on a conveying line, along an advancement direction, each comprising at least one shaping cavity;

providing a dispensing machine along said conveying line provided with a formation of nozzles comprising at least one line of nozzles arranged along a direction transversal to said advancement direction;

carrying said moulds one after another, by means of said conveying line, to said nozzle formation, and dispensing a given quantity of said material through one or more of said nozzles, within said at least one shaping cavity of a mould that has reached said nozzle formation, said process being characterized in that:

said dispensing step is executed while said mould continues to advance below said nozzle formation along said advancement direction, said at least one shaping cavity of said mould has a depth that varies along said advancement direction;

said dispensing step comprises varying the quantity of material dispensed into said shaping cavity as a function of the position of said mould along said advancement direction in such a way that the dispensed quantity is a function of the depth variation within said shaping cavity.

The process described herein, therefore, envisages depositing the foodstuff material within the shaping cavities of the moulds while they continue to advance along the conveying line, without stopping them, which instead occurs in the processes of the prior art.

Moreover, the process described herein envisages varying the quantity of material dispensed in the individual shaping cavity of a mould that has reached the formation of nozzles, depending on how the depth of this cavity varies.

This is carried out indifferently to form both full products and hollow products, for example, pralines, chocolate tablets or bars, chocolate shells or half-shells, etc.

With reference to the latter, the Applicant has verified that regulating the quantity dispensed as a function of the variation in the depth of the cavity, allows an optimal distribution of the material to be obtained over its entire forming surface.

The process described here is therefore able to dispense the foodstuff material optimally for the moulding of products of any shape and size.

Moreover, in preferred embodiments, the process described herein may envisage, in the context of the same industrial process, dispensing of foodstuff material into different shaping cavities, for the moulding of products that are different from each other, by varying the quantity of material dispensed into the individual shaping cavity based on its specific geometry and/or shape.

Preferred embodiments of the process described herein relate to the dispensing of liquid chocolate, its surrogates, creams, etc.

Moreover, the dispensing of material in the fluid state presenting a viscosity comprised between 0 and 10,000 mPa s is also a preferred application.

With reference now to FIG. 1, this represents an example of a dispensing system for implementing the process described herein.

This system comprises a conveying line 2, which moves a plurality of moulds M1, M2, etc., along a advancement direction X, and a dispensing machine 4, which is arranged with a formation of nozzles 6 arranged in a row along a direction K transversal to the advancement direction X.

The dispensing machine 4 is provided with a system for controlling the flow of material dispensed through the nozzles 6. As will be seen in detail below, in preferred embodiments, this system is configured both to feed or to block the flow of material, and to regulate its flow rate.

The dispensing system also comprises a control unit—not illustrated—configured to control the conveying line 2 and the dispensing machine 4 in a coordinated manner. This control unit may consist of a plurality of separate control modules, each configured to implement respective steps or operations of the process described herein.

This control unit can also be connected to various sensors. In particular, this unit can be connected to one or more sensors configured to detect the position of the moulds along the conveying line 2, for example, position or movement sensors, and to one or more sensors configured to identify the type of mould approaching the dispensing machine 4, for example, a video camera, a barcode reader, an RFID tag reader.

In FIG. 1, two moulds M1 and M2 are shown on the conveying line 2, which have different shaping cavities and a different number of cavities.

In particular, the mould M1 has a plurality of rows of cavities, each consisting of six cavities aligned along a direction perpendicular to the advancement direction X of the conveying line 2. On the other hand, the mould M2 has a single row consisting of only two cavities.

Moreover, the cavities of the mould M2 are larger than the cavities of the mould M1, both with reference to the length of the outer perimeter, or rather, to the extension in plan of the cavity, and with reference to the maximum depth.

Figure 1A:
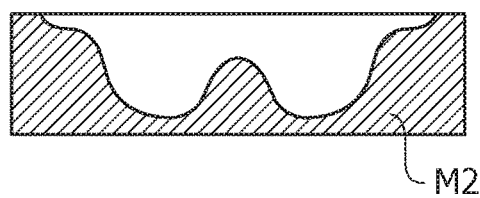
FIG. 1A represents a cross-sectional view of a mould moved by the system of FIG. 1.
Figure 1B:
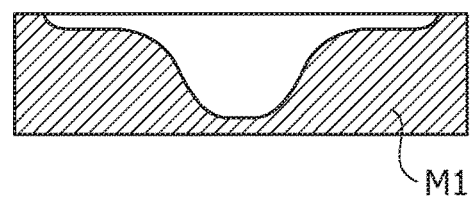
FIG. 1B represents a cross-sectional view of a mould according to the system of FIG. 1.

FIGS. 1A and 1B show a cross-section of an individual shaping cavity of the two moulds M1 and M2, respectively, on a vertical plane parallel to the advancement direction X.

It should be noted that the surface of the cavities of both moulds M1 and M2 has a variable pattern, so that the depth of the cavity with respect to the upper plane of the mould varies along the direction X.

The application referred to herein concerns indifferently the moulding of solid or hollow products; these will have an outer surface provided with a conformation corresponding to that of the forming surface of the cavities of the moulds M1 and M2.

With respect to the illustrated example of application, the process described herein involves moving the moulds M1 and M2 on the conveying line 2, along the advancement direction X, and depositing the foodstuff material into the shaping cavities of the two moulds while they pass below the formation of nozzles 6 and continue to advance along the direction X.

In particular, when the mould M1 passes below the nozzles 6, the foodstuff material is deposited on each cavity of the individual rows of the mould by a respective nozzle 6. The various rows of cavities are filled at different times as they follow one another below the nozzles 6.

Conversely, when the mould M2 passes, the foodstuff material is deposited on each of the two shaping cavities by a sub-assembly of the nozzles 6, for example, by three nozzles for each cavity. Obviously, the two cavities of the mould M2 are filled by the nozzles 6 in a single dispensing step.

In preferred embodiments, the process involves constantly adjusting the flow rate of material dispensed by the nozzles 6, in order to dispense the material optimally for each of the different shaping cavities that follow one another below the nozzles 6.

First of all, this adjustment is carried out as a function of the variation of the depth in the individual cavity of the mould along the same advancement direction X.

Due to the movement of the mould along the advancement direction X, this variation will appear identically below the nozzles and these will dispense a regulated flow rate based on this variation.

With particular reference to the shaping cavities of the mould M1, the single nozzle 6 will therefore dispense a variable flow rate of material depending on the depth of the cavity along the direction X, i.e., as a function of the depth of the cavity at the point where the nozzle is arranged therealong, moment by moment.

Therefore, the nozzle will dispense a smaller flow rate of material where the cavity is shallower, and instead will dispense a greater flow rate of material where the cavity is deeper.

Figure 2A:
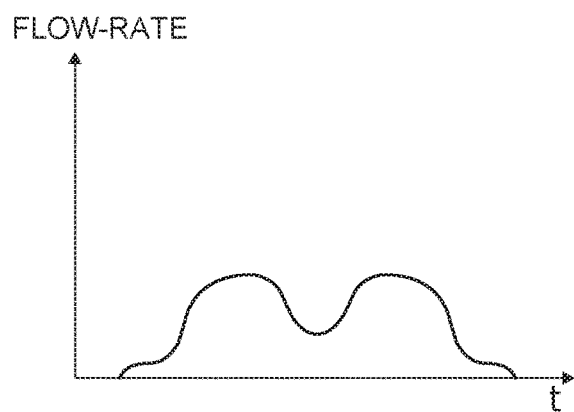
FIG. 2A represents an example of variation in flow rate for the dispensing of material into the mould of FIG. 1A.

In this regard, by way of example, FIG. 2A represents an example of the flow rate pattern dispensed by the single nozzle 6 during the dispensing of the foodstuff material into a shaping cavity of the mould M1.

In this case, the adjustment is proportional and continuous with the variation of the cavity depth; it is—in any case—clear that, in general, it is possible to envisage adjustments that follow laws that deviate from the pattern of the variation considered, for example, stepwise adjustments, in order to facilitate control of the process.

As mentioned above, this type of adjustment allows obtainment of a uniform distribution of the material on the forming surface of the mould cavity, whatever the shape and/or size of the cavity.

The process will, in any case, similarly to the known processes, subject the mould to vibrations after the dispensing step of the material.

It should be noted that the same type of flow rate adjustment can be implemented for any other variation in the shape or size of the individual shaping cavity of the mould along the direction X, for example, a width variation (identified along a direction transverse to the direction X).

The flow rate adjustment indicated may relate, secondly, to the transition from a first type of cavity to a second type of cavity.

With reference to the illustrated example, this adjustment, therefore, relates to the passage from the mould M1 to the mould M2.

In particular, this adjustment envisages that the flow rates dispensed by the individual nozzles are set to new values provided for the cavities of the mould M2.

These new values will be determined taking into account the fact that—in this case—dispensing in the individual cavity of the mould M2 is carried out by an assembly of nozzles 6, and not by a single nozzle.

Moreover, the same type of flow rate adjustment described above, depending on the depth of the cavity, will be implemented to dispense the material into each of the cavities of the mould M2, since these have a variable depth, similarly to the cavities of the mould M1.

Figure 2B:
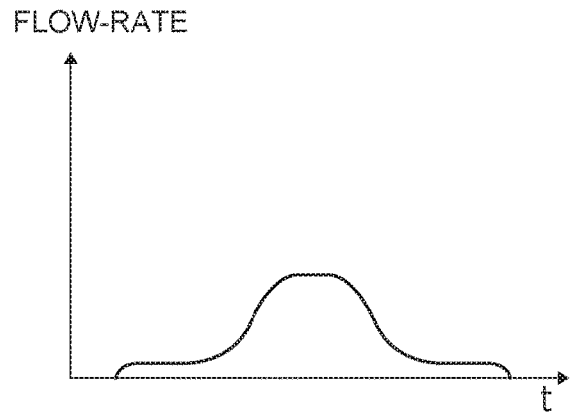
FIG. 2B represents an example of variation in flow rate for the dispensing of material into the mould of FIG. 1B.

In this regard, FIG. 2B represents an example of the flow rate pattern dispensed during dispensing of the foodstuff material into a shaping cavity of the mould M2; in this case as well, the flow rate variation is proportional to the variation in the depth of the cavity.

It should be noted that this flow rate adjustment may be uniform for all the nozzles or may differentiate between one nozzle and another.

Returning to the dispensing system, as anticipated above, the dispensing machine may be equipped with a system for controlling the flow dispensed through the nozzles, which is configured both to feed or block the flow of material and to regulate its flow rate.

Always preferentially, this system can be arranged to operate independently on the individual nozzles.

Figure 3:
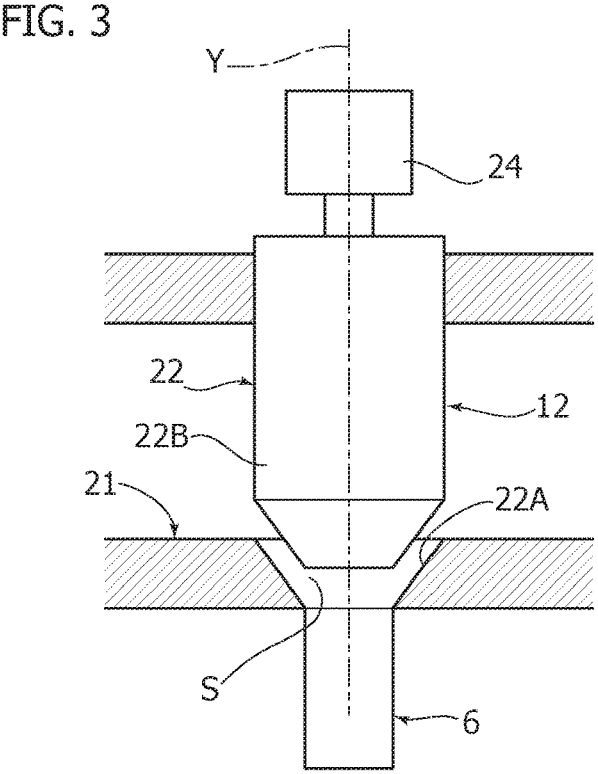
FIG. 3 schematically represents a control system for the flow of dispensed material, according to a first embodiment.

FIG. 3 illustrates a first embodiment of the control system in question.

According to this embodiment, a flow valve 12 is associated with the single nozzle 6, which is arranged to control the communication between a duct 22 for feeding the foodstuff material, and the nozzle 6.

The valve 22 is configured to operate with a variable flow section S.

In various preferred embodiments, as in that illustrated, this valve has a conical valve seat 22A, and a plunger 22B provided with a correspondingly shaped end, which is movable along the axis Y of the valve, and cooperates with the seat 22A for opening and closing the passage through the valve seat which causes the duct 22 to communicate with the nozzle 6.

The plunger 22B is controlled by a linear actuator 24 to assume different positions along the axis Y, in order to define—together with the valve seat 22A—flow sections S of variable width according to the position assumed by it along this axis.

Referring now to the application example illustrated in FIGS. 1, 1A and 1B, to deposit the foodstuff material into a shaping cavity of the mould M1, the actuator 24 moves the plunger 22B away from the valve seat 22A to open the passage through the valve seat 22A, and adjusts it in position, moment by moment, so as to define a flow section S capable of generating the envisaged flow rate of material for the relative position assumed by the nozzle 6 along the shaping cavity, for example, according to the curve shown in FIG. 2A.

The same control method can be used to deposit the foodstuff material into a cavity of the mould M2.

Figure 4:
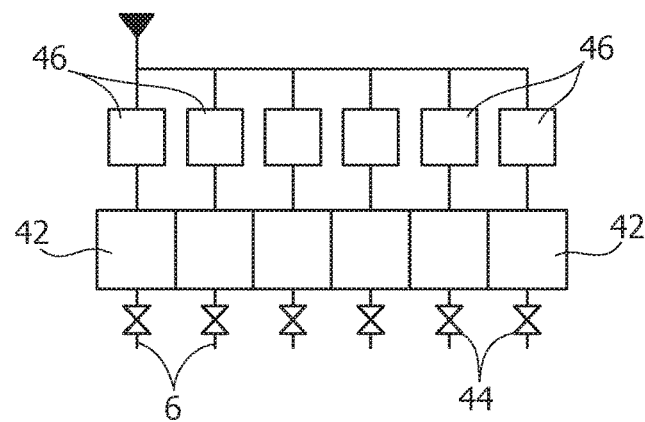
FIG. 4 schematically represents a control system for the flow of dispensed material, according to a second embodiment.

With reference now to FIG. 4, this represents a second embodiment of the system for controlling the flow dispensed by the nozzles 6.

According to this embodiment, each nozzle 6 is connected to a respective chamber 42 containing the foodstuff material, which is separated from the respective chambers of the other nozzles, and which has the function of feeding the material to the nozzle associated therewith.

A control valve 44 is arranged downstream of the chamber 42, between the latter and the nozzle, to open or close the passage towards the nozzle 6.

Upstream of the chamber 42, a pressure regulation device 46 connects the chamber to a supply of the material and operates to vary the pressure within the chamber 42 as a function of the flow rate of material to be dispensed through the nozzle 6.

With reference to the operation, to dispense the material into a shaping cavity of the mould M1, even before the valve 44 opens the passage to the nozzle 6, the chamber 42 is carried through the device 46 at a predetermined pressure to generate the flow rate envisaged for starting the dispensing into the shaping cavity, as soon as it faces below the nozzle 6.

Once the valve 44 starts depositing material into the cavity, the pressure of the chamber 42 is then regulated by the device 46 so that, moment by moment, the pressure of the chamber 42 is able to generate the flow rate envisaged for the relative position assumed by the nozzle 6 along the cavity, according to the curve shown in FIG. 2A.

The same control method can be used to dispense the foodstuff material into a shaping cavity of the mould M2.

Figure 5:
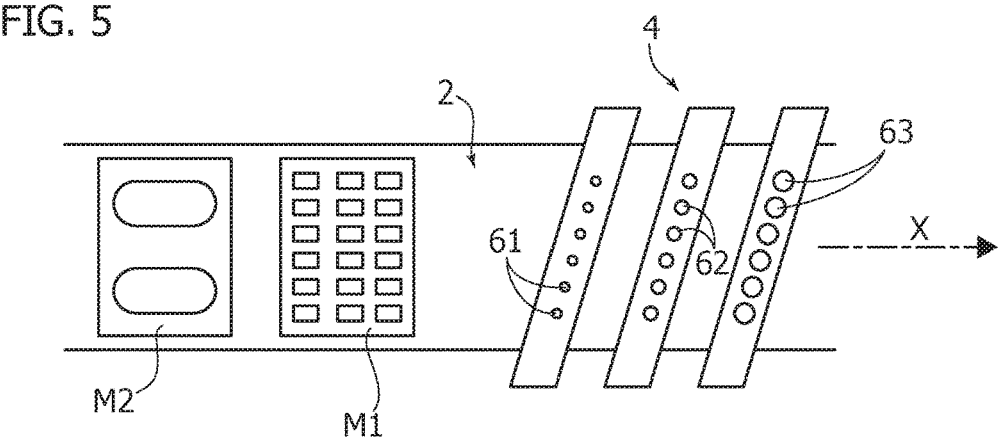
FIG. 5 schematically represents an additional embodiment of the system described herein.

With reference now to FIG. 5, this illustrates a variant of the dispensing system described herein in which the dispensing machine 4 is arranged with a plurality of rows of nozzles arranged in succession along the advancement direction X.

According to an important characteristic of this variant, the nozzles have an outflow section that increases from one row to the next, with respect to the advancement direction, so that the flow rate of material dispensed by the nozzle of a subsequent row is proportionally greater than that of a nozzle in a previous row.

In the illustrated example, three rows of nozzles arranged in succession are provided along the direction X, the respective nozzles of which are indicated with the references 61, 62, 63. The nozzles 61 of the first row—identified with respect to the advancement direction—are the smallest, while the nozzles 63 of the third row are the largest.

In a manner known per se, the nozzles 61, 62, 63 of the individual rows are associated with respective flow valves—not illustrated—arranged to control the dispensing of the flow of material therethrough.

The formation of nozzles of the variant in question enables adjustment of the quantity of material dispensed, which is achieved by selectively activating the nozzles of the different rows according to the quantity envisaged for the various zones of the shaping cavity.

This means that depending on the zone concerned, it will receive the material from the nozzles of one row rather than those of another, or it can receive the material from the nozzles of several rows.

The selection of the nozzles suitable for dispensing the material into a given area of the cavity depends on its depth, according to the same criteria already highlighted above.

Figure 6:
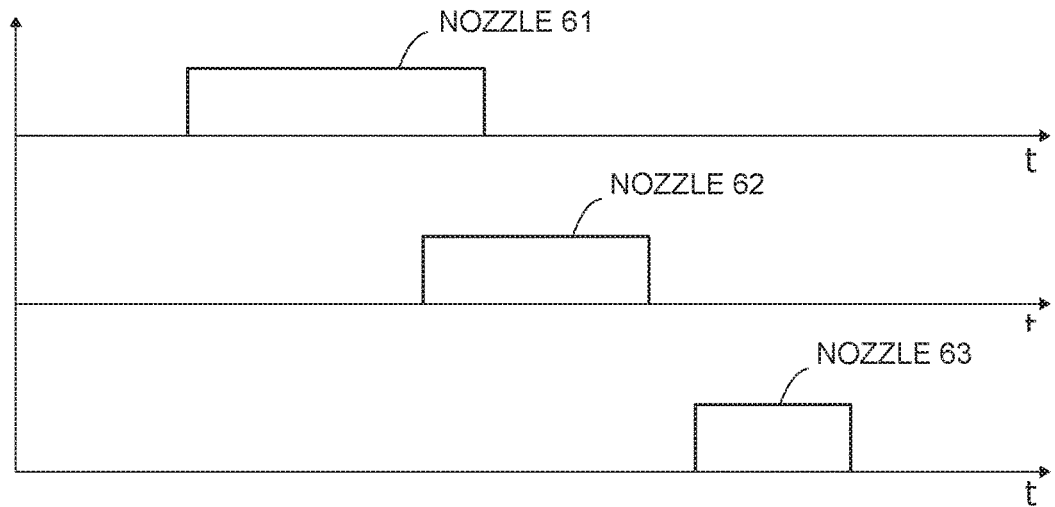
FIG. 6 represents an example of controlling the flow of dispensed material, realized by the system of FIG. 5.

In this regard, by way of example, FIG. 6 represents the activation pattern of the nozzles of the three rows illustrated, for dispensing the foodstuff material into a shaping cavity of the mould M2.

Similarly to what has been seen above, the nozzles that perform the dispensing of material in the cavity of the mould M2 are three for each row. In any case, for the sake of simplicity, reference will be made below to a single nozzle for each row.

Clearly, the method of depositing the foodstuff material is that already described above, or rather, it envisages the provision of a greater quantity of material where the cavity is deeper, and provision of a smaller quantity where the cavity is shallower.

According to the embodiment in question, this dispensing method is achieved by first activating only the smallest nozzle 61, for dispensing the material in the shallower peripheral zone of the cavity, and successively activating the larger nozzles 62 and 63 as well, to dispense a quantity of material gradually increasing towards the deeper central area of the cavity.

It should be noted that—in this case—regulating the dispensed quantity is given both in that the flows of the three nozzles have an increasing flow rate from one nozzle to the other, and in that the flows of the nozzles are overlapped with each other at predetermined times.

Figure 7A:
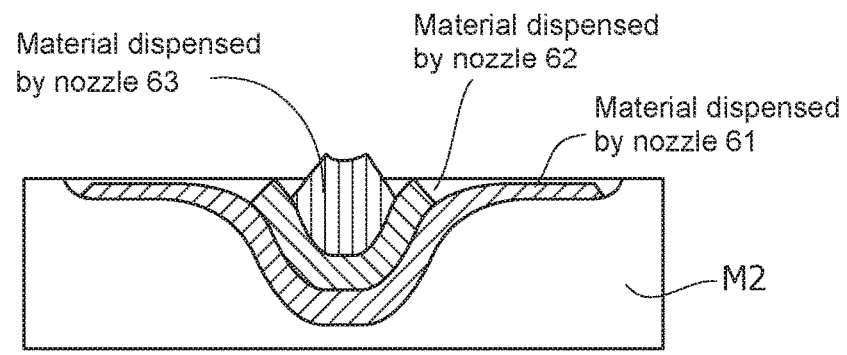
FIG. 7A represents an example of distributing the dispensed material within a mould cavity.

In this regard, FIG. 7A represents the distribution, in the shaping cavity of the mould M2, of the material dispensed by the three nozzles 61, 62, and 63.

As can clearly be seen from this figure, starting from an end edge of the cavity, the total quantity of material deposited is initially given by the quantity dispensed by the only nozzle 61, then, as the depth of the cavity increases, by the sum of the quantities of material dispensed from the nozzles 61 and 62, and finally, in the deeper central region, by the sum of the quantities supplied by all three nozzles 61, 62 and 63.

Returning to the dispensing process, when the cavity of the mould instead reaches a relative position with respect to the nozzles so that its depth begins to decrease, the nozzles are correspondingly deactivated one after the other, starting from the largest nozzle 63 and ending with the smallest nozzle 61.

As seen, in the illustrated example, the flow rate variation is obtained by summing the flows of the nozzles 61, 62 and 63 of the different rows. In any case, it is also possible to provide operating modes in which the flow rate adjustment is instead based on a selective and alternate activation of the rows of nozzles. For example, an increase in flow rate can be achieved simply by activating a row with larger nozzles instead of—and not in addition to—a row with smaller nozzles.

Figure 7B:
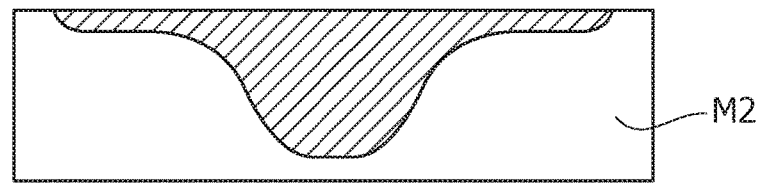
FIG. 7B represents the dispensed material of FIG. 7A after the mould has been subjected to vibrations.

After the step of dispensing the material into the cavity of the mould M2, this is then subjected to vibrations to distribute the material evenly over the entire surface of the cavity. FIG. 7B represents, in this regard, how the material deposited in the cavity appears, at the end of this step.

To form a hollow product, for example, a chocolate half-shell, the mould is overturned at the end to discharge the excess chocolate.

Returning now to the formation of the nozzles according to the variant of FIG. 5, in preferred embodiments, the law with which the flow section of the nozzles increases along the succession of rows envisages that it doubles from one row to the next, so as to guarantee a substantial increase in the dispensed flow rate already in the space of two adjacent rows.

However, it is also possible to envisage other types of variation laws, depending on the needs of the specific applications. Among other things, it is clear that these nozzles can also be positioned in an inverse order along the advancement direction X, i.e., in such a way as to present decreasing (and not increasing) sections along this direction.

Of course, without prejudice to the principle of the invention, the details of construction and the embodiments may vary, even significantly, with respect to those illustrated here, purely by way of non-limiting example, without departing from the scope of the invention as defined by the attached claims.

The invention claimed is:

1. A process for dispensing fluid foodstuff material into a shaping cavity of a mould,
comprising the steps of:
advancing a plurality of moulds (M1, M2) on a conveying line (2), along an advancement direction (X), each comprising at least one shaping cavity;
providing a dispensing machine (4) along said conveying line (2) provided with a formation of nozzles (6; 61, 62, 63) comprising at least one line of nozzles arranged along a direction (K) transversal to said advancement direction (X);
carrying said plurality of moulds (M1, M2) one after another, by means of said conveying line (2), to said nozzle formation (6; 61, 62, 63), and
dispensing a given quantity of said material through one or more nozzles of said at least one line of nozzles, into said at least one shaping cavity of a mould that has reached said nozzle formation,
said process being characterized in that:
said dispensing step is executed while said mould continues to advance below said nozzle formation (6; 61, 62, 63), along said advancement direction (X),
said at least one shaping cavity of said mould has a depth that varies along said advancement direction (X);
said dispensing step comprises varying the given quantity of said material dispensed into said at least one shaping cavity as a function of position of said mould along said advancement direction (X) in such a way that the given quantity of said material dispensed is a function of depth variation within said at least one shaping cavity.

2. A process according to claim 1, wherein said dispensing step comprises dispensing said foodstuff material through a single nozzle of said nozzle formation (6; 61, 62, 63) into a corresponding portion of said at least one shaping cavity, which extends along said advancement direction (X);
wherein said corresponding portion of said at least one shaping cavity has a depth that varies along said advancement direction (X);
wherein said dispensing step comprises varying a flow rate of material dispensed by said single nozzle as a function of said depth variation of said corresponding portion.

3. A process according to claim 1, wherein said plurality of moulds (M1, M2) advance along said advancement direction (X) at a constant velocity.

4. A process according to claim 1, wherein said dispensing step comprises dispensing said material through a series of nozzles of said formation of nozzles (6; 61, 62, 63), along corresponding portions of said at least one shaping cavity that extend along said advancement direction (X), wherein said corresponding portions of said at least one shaping cavity have a depth varying along said advancement direction (X), and wherein said dispensing step comprises varying a flow rate dispensed through said nozzles independently among said nozzles and, for each nozzle, as a function of said depth variation of the respective corresponding portion of said at least one shaping cavity.

5. A process according to claim 1, wherein a number of nozzles of said nozzle formation (6; 61, 62, 63) depends on a maximum volume to dispense in a time unit.

6. A process according to claim 4, wherein each nozzle of said nozzle formation (6; 61, 62, 63) dispenses an overall quantity that—in terms of volume—is equal to an area of said corresponding portions of said at least one shaping cavity multiplied by a diameter of said nozzle, so that a total volume dispensed by said series of nozzles corresponds to an overall volume of said at least one shaping cavity.

7. A process according to claim 1, wherein said nozzle formation (6; 61, 62, 63) comprises a plurality of lines of nozzles (61, 62, 63), each extending along a direction (K) transversal to said advancement direction (X), wherein the nozzles (61, 62, 63) of each line are equal to each other, while the nozzles of different lines of said plurality of lines (61, 62, 63) are dimensioned so as to dispense different flow rates of material, and wherein said dispensing step comprises selectively activating the different lines of said plurality of lines (61, 62, 63) of nozzles as a function of position of said mould that has reached said nozzle formation along said advancement direction (X), so as to dispense a quantity of material into said at least one shaping cavity, that varies along said advancement direction (X) as a function of said depth variation of said at least one shaping cavity.

8. A process according to claim 7, wherein the nozzles of said plurality of lines of nozzles (61, 62, 63) have flow passage cross-sections that increase from one line of the plurality of lines of nozzles (61, 62, 63) to a next one of the plurality of lines of nozzles (61, 62, 63).

9. A process according to claim 7, wherein said dispensing step comprises dispensing said material through one or more nozzles of a series of lines of said plurality of lines of nozzles (61, 62, 63), along a corresponding portion of said at least one shaping cavity, which extends along said advancement direction (X), wherein said corresponding portion of said at least one shaping cavity has a depth that varies along said advancement direction (X); and wherein said dispensing step comprises selectively activating said one or more nozzles of said plurality of lines of nozzles (61, 62, 63) as a function of position of said mould that has reached said nozzle formation along said advancement direction (X), so as to dispense a quantity of material into said corresponding portion of said at least one shaping cavity, that varies along said advancement direction (X) as a function of said depth variation of said corresponding portion of said at least one shaping cavity.

10. A process according to claim 1, comprising subjecting said plurality of moulds to vibrations, successively to said dispensing step.

11. A process according to claim 1, wherein said advancing step comprises advancing a first mould (M1) of said plurality of moulds (M1, M2) provided with at least one first shaping cavity and successively advancing a second mould (M2) of said plurality of moulds (M1, M2) provided with at least one second shaping cavity, and wherein said dispensing step comprises controlling—according to a first regulation mode—a first quantity of said material dispensed into said at least one first shaping cavity of said first mould (M1), when said first mould (M1) reaches said nozzle formation (6; 61, 62, 63) and advances below said formation of nozzles (6; 61, 62, 63) along said advancement direction (X), and comprises controlling—according to a second regulation mode—a second quantity of said material dispensed into said at least one second shaping cavity of said second mould (M2), when said second mould (M2) reaches said formation of nozzles (6; 61, 62, 63) and advances below said formation of nozzles (6; 61, 62, 63) along said advancement direction (X).

12. A process according to claim 8, wherein the nozzles of said plurality of lines of nozzles (61, 62, 63) have flow passage cross-sections that double from one line of the plurality of lines of nozzles (61, 62, 63) to a next one of the plurality of lines of nozzles (61, 62, 63).

* * * * *